A. B. GOODALL.
Joint for Lead-Pipes.
No. 163,588. Patented May 25, 1875.
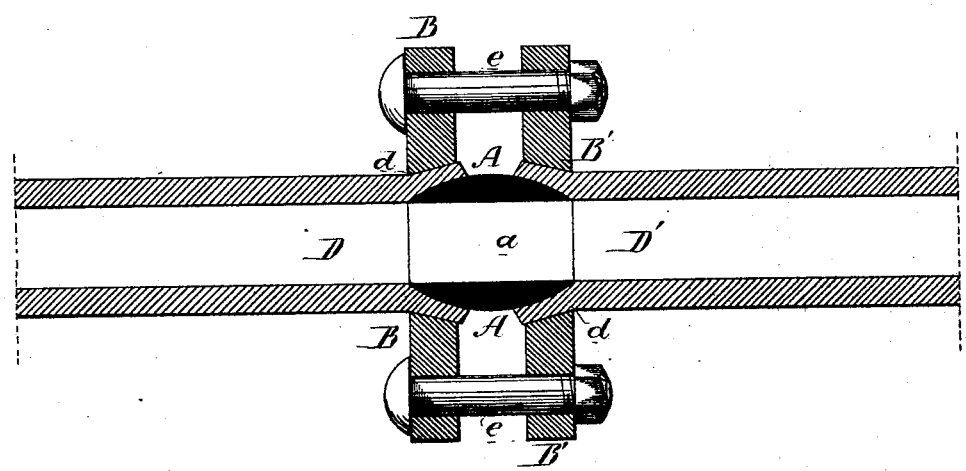

UNITED STATES PATENT OFFICE.

ALBERT B. GOODALL, OF PHILADELPHIA, PENNSYLVANIA, ASSIGNOR OF ONE-HALF HIS RIGHT TO JOHN W. BIDDLE, OF SAME PLACE.

IMPROVEMENT IN JOINTS FOR LEAD PIPES.

Specification forming part of Letters Patent No. 163,588, dated May 25, 1875; application filed September 15, 1874.

*To all whom it may concern:*

Be it known that I, ALBERT B. GOODALL, of Philadelphia, Pennsylvania, have invented an Improved Joint for Lead Pipes, of which the following is a specification:

The object of my invention is an improvement in the construction of clamping appliances employed in connecting the adjoining ends of pipes; and I attain this object by combining a tubular coupling-block, A, and clamping-plates B and B' with the opposite ends D and D' of the lead pipe, in the manner fully described hereafter, and illustrated by the sectional view in the accompanying drawing.

The coupling-block A has a longitudinal opening, $a$, extending through it, of about the same diameter as the interiors of the pipes to be jointed, and its exterior is curved, in the manner shown, so as to give it somewhat the appearance of an egg; but the said block may, if desired, be of the shape of a double cone, or uniformly tapering in both directions from the center toward its ends. The clamping-plates B and B' have central tapering openings $d\ d$ for the reception of the ends of the pipes, and holes near their outer ends for the passage of screw-bolts $e$, furnished with nuts $f$.

In forming the joint, the ends D and D' of the pipe are first passed through the tapering openings $d$ in the clamping-plates B and B', and are swaged into the same by means of any suitable blunt and tapering instrument. The tubular coupling-block A is then introduced into the expanded ends of the pipes, and the bolts $e$ are passed through the holes in the clamping-plates, and tightened by means of their nuts, the result being that the pipes will be wedged so tightly between the block and plates as to effectually prevent leakage.

The pipes can be separated at any time by simply loosening the nuts and withdrawing the bolts, the usual necessity of cutting the said pipes being thus avoided.

As the clamping device consists of flat plates with tapering openings and ordinary screw-bolts, it is not only more simple in construction, but lighter in weight, less expensive, and more readily manufactured and applied than the ordinary clamps having flanged plates or screw-couplings.

I claim as my invention—

The combination, with the flaring ends of the pipes D D' and internal tubular block A, of the plates B B', having openings with beveled edges, and the screw-bolts $e\ e$, all as set forth.

In testimony whereof I have signed my name to this specification in the presence of two subscribing witnesses.

A. B. GOODALL.

Witnesses:
HUBERT HOWSON,
HARRY SMITH